June 16, 1953  W. VAN DYKE  2,642,321
SHAFT TIGHTENER INSERT
Filed Jan. 9, 1951
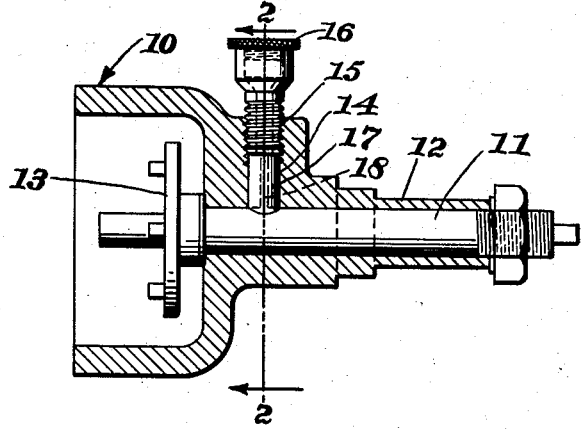
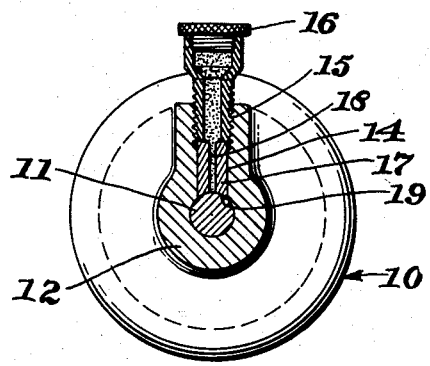
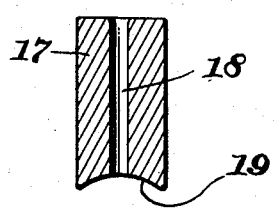
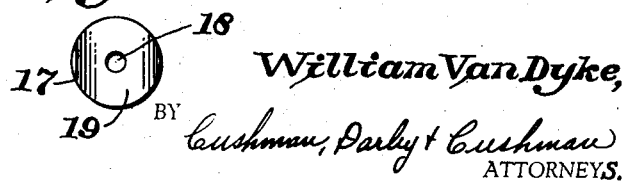
INVENTOR:
William Van Dyke,
BY Cushman, Darby & Cushman
ATTORNEYS.

Patented June 16, 1953

2,642,321

UNITED STATES PATENT OFFICE 2,642,321

SHAFT TIGHTENER INSERT

William Van Dyke, Averill Park, N. Y.

Application January 9, 1951, Serial No. 205,122

2 Claims. (Cl. 308—65)

This invention relates to a new and improved means for compensating for shaft wear or bearing wear occurring from prolonged rotation of a shaft journalled in bearings which are mounted in a housing or are formed by the housing.

In particular, this invention provides a shaft tightener insert to be positioned in a hole extending radially from the shaft axis in a shaft housing. One end of the insert bears against the shaft and may be held against the same by tightening means for procuring optimum drag on a shaft rotating in the bearings of a housing and thereby overcome objectionable wobble of the shaft caused by wear of either the shafting or bearings.

It is a principal object, therefore, of this invention to provide a shaft tightener device which will compensate for the wear of a shaft or will compensate for wear of the housing bearings due to continued rotation of the shaft in the same.

It is a further object of this invention to provide such a shaft tightener device which will also permit the flow of lubricating oil or grease through the tightener device at the same time as it functions for compensating for wear and thereby reduce frictional drag occurring due to the position of the insert device.

A further object of this invention is to provide such a shaft tightener device which may be inserted in the usual radial hole which is internally tapped at the outer end thereof for receiving a grease or oil cap fitting and which is found in many shaft housings.

In the accompanying drawings:

Figure 1 is a longitudinal cross sectional view of a distributor housing incorporating the shaft tightener insert of this invention in the lubrication opening which receives the usual grease or oil cap;

Figure 2 is a cross sectional view taken along the line 2—2 of Figure 1;

Figure 3 is an enlarged sectional view of the shaft tightener insert of Figure 2; and Figure 4 is an end view of the enlarged sectional view of Figure 3.

Referring now to Figures 1 and 2, there is shown for the purposes of illustration only, a distributor housing indicated generally at 10 having the usual distributor shaft 11 journaled in the shaft distributor housing 12 which forms an integral part of the distributor housing 10. At the end of the distributor shaft 11 projecting into the distributor housing is affixed the usual distributor rotor 13. Generally, as shown, a radial hole 14 is provided in the distributor shaft housing 12 for the purpose of receiving by means of the internal tapped portion 15 a grease or oil cap 16.

As shown in the drawings, the distributor shaft housing opening 12 acts as a bearing for the distributor shaft 11. If desired, however, an additional bearing surface may be placed in the opening and as usual, in order to accommodate the flow of grease or oil through the radial hole 14 from the cap 16, there would be provided an opening through this bearing surface.

Upon prolonged usage of the distributor, wear frequently will occur either to reduce the diameter of the distributor shaft 11 or to enlarge the distributor shaft housing bearing opening 12 to the extent that a wobble motion occurs upon rotation of the distributor shaft which thereby prevents the correct spark gap from functioning to provide timed distributor action. Upon the event of such wear, it is normal practice either to provide a new distributor shaft of increased diameter to compensate for an enlargement of the distributor shaft housing opening 12 or to compensate for the reduced diameter of the original distributor shaft 11. By utilizing the shaft tightener insert of this invention such costly replacement is no longer necessary. Further, the particular shaft tightener insert of this invention may be conveniently positioned in the radial hole 14 in a position to compensate for the wear of the shaft and at the same time permit the usual flow of grease or oil as required from the cap 16 and thereby lubricate the shafting and bearings.

As shown in Figures 3 and 4, the shaft tightener insert of this invention comprises a longitudinal tubular member 17. The opening 18 therein serves as indicated above to permit the passage of grease or oil therethrough from the grease cup 16 to the distributor shaft 11. At one end of this tubular shaft tightener insert 18 there is provided an arcuate cylindrical bearing surface 19 having a radius substantially equal to that of the distributor shaft 11 and an axis perpendicular and coplanar with the longitudinal axis of the tubular member 17.

Upon wear of either of the shaft 11 or the housing bearing 12, it is merely necessary to remove the grease or oil cap 16 by unscrewing it from the internally tapped thread 15, insert the shaft tightener device into the opening in a position such that the arcuate cylindrical bearing surface 19 rests against the distributor shaft 11, and then replace the grease or oil cap 16 by screwing it into the internally tapped thread 15 to an extent sufficient to obtain an optimum drag on the distributor shaft 11 in the distributor shaft housing bearing opening 12. Optimum drag may be determined by manually rotating the distributor shaft 11 while adjusting the position of the grease or oil cap 16. If sufficient drag is not imposed, a wobble action will still remain in the shaft as it rotates. If too much drag is imposed the friction developed between the insert, the shaft, and the housing bearing will prevent the required freedom on rotation of the distributor shaft 11.

Although the shaft tightener insert has been described supra to be of particular use for compensating for the wear of a distributor shaft in a distributor housing, it is apparent that such a shaft tightener insert may be used with any shaft mounted in a housing wherein the housing serves as bearing means or supports bearing means for the rotation of the shaft. It is further not necessary that the shaft be supported throughout its entire length by the housing. The shaft may be supported at its ends in the housing and the insert may be placed intermediate the ends of the shaft by its insertion through any convenient opening found in the housing or an opening supplied by drilling the housing and tapping. Furthermore, in such a housing a shaft tightener of this invention may be applied at one or each of the bearing points by making use of radial openings found there for grease or oil cups, or other purposes, or by drilling and tapping. Normally, however, a grease or oil cup such as 16 will be found in most housings and permits the ready installation of the shaft tightener insert of this invention without necessary drilling or removal of other parts.

This particular device is, of course, of importance where it is necessary for a shafting to be lubricated and it is, therefore, desirable if it is necessary to bore a housing for the purpose of receiving such an insert, to tap the outer end of the opening for the purpose of receiving an oil or grease cap and thereby permit lubrication of the shafting at the point of contact of the shaft tightener insert and the shaft.

The drawings, therefore, submitted herewith are for the purpose of illustration only and are not limiting to the scope of the claims wherein:

I claim:

1. In combination a housing, a shaft rotatably supported therein, an opening through said housing communicating from the exterior with said shaft, a shaft tightener insert within said opening, said insert comprising a tubular member having an arcuate cylindrical bearing surface at one end thereof adjacent said shaft, and a lubrication cup having its discharge end adjustably received at the end of the opening communicating with the exterior for obtaining an optimum drag between said shaft and said shaft support.

2. In combination a bearing, support means for said bearing, a shaft rotatably received by said bearing, a lubrication opening through said bearing support means and said bearing communicating from the exterior with said shaft, a shaft tightener insert within said opening, said insert comprising a tubular member having an arcuate cylindrical bearing surface at one end thereof adjacent said shaft, and a lubrication cup having its discharge end adjustably received in the opening through said bearing support means for securing an optimum drag between said shaft and said bearing.

WILLIAM VAN DYKE.

References Cited in the file of this patent

UNITED STATES PATENTS

| Number | Name | Date |
|---|---|---|
| 1,315,735 | Michell | Sept. 9, 1919 |
| 1,697,046 | Chapman | Jan. 1, 1929 |
| 2,003,316 | Schein | June 4, 1935 |
| 2,224,652 | Kingsbury | Dec. 10, 1940 |
| 2,354,870 | Messinger | Aug. 1, 1944 |
| 2,450,734 | Majeski | Oct. 5, 1948 |